May 3, 1960 E. D. HANSON 2,935,226
APPARATUS FOR MAGAZINING ARTICLES
Filed March 7, 1955 3 Sheets-Sheet 1

INVENTOR.
E. D. HANSON
BY [signature]
ATTORNEY

INVENTOR.
E. D. HANSON

May 3, 1960  E. D. HANSON  2,935,226
APPARATUS FOR MAGAZINING ARTICLES
Filed March 7, 1955  3 Sheets-Sheet 3
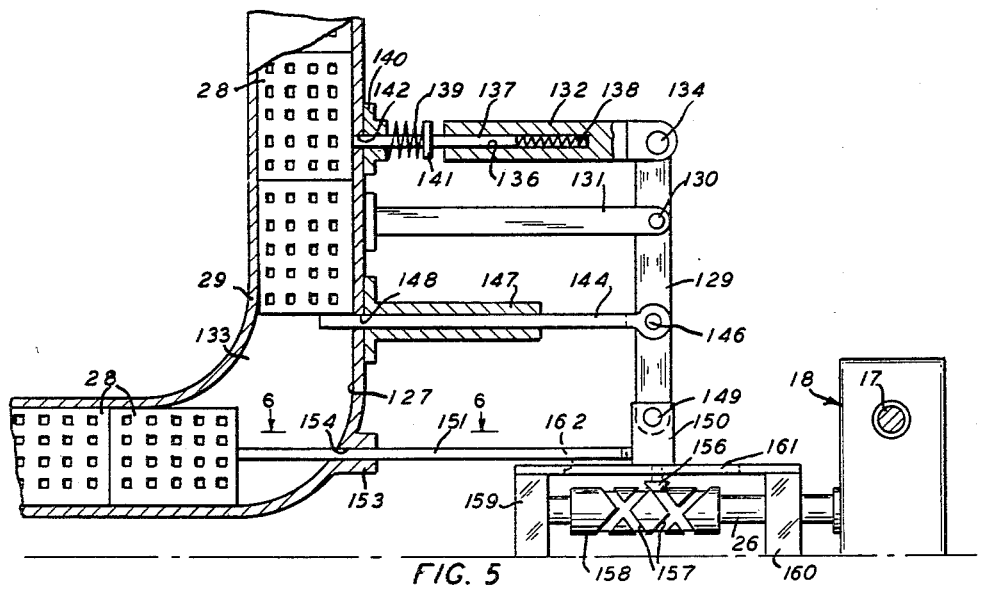
FIG. 5
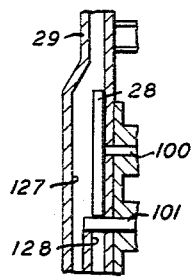
FIG. 4-a
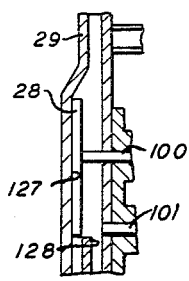
FIG. 4-b
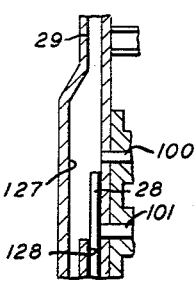
FIG. 4-c
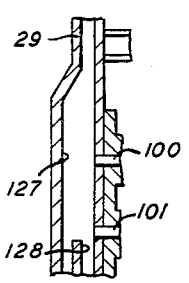
FIG. 4-d
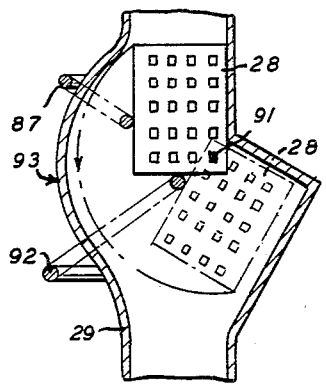
FIG. 3
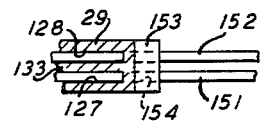
FIG. 6
INVENTOR.
E. D. HANSON
BY
ATTORNEY United States Patent Office 2,935,226
Patented May 3, 1960

2,935,226

APPARATUS FOR MAGAZINING ARTICLES

Estyle D. Hanson, Baltimore, Md., assignor to Western Electric Company, Incorporated, New York, N.Y., a corporation of New York Application March 7, 1955, Serial No. 492,599

7 Claims. (Cl. 221—171)

This invention relates to apparatus for magazining articles, and more particularly to apparatus for orienting plate-like parts and feeding them to an assembling machine.

In the manufacture of certain types of terminal strips used in the telephone industry, it is necessary to feed plate-like parts to an assembling machine in an oriented order.

An object of the present invention is to provide new and improved apparatus for magazining articles.

Another object of the invention is to provide new and improved apparatus for orienting plate-like parts and feeding them to an assembling machine.

Apparatus embodying certain features of the invention and suitable for orienting plate-like articles having at least two recesses therein may include a guideway through which the articles pass successively, and means designed to engage a recess in the article if the article is incorrectly oriented in the guideway so that the article pivots about the means in the guideway to orient the article correctly.

Other objects and advantages of the invention will appear from the following detailed description of an apparatus forming a specific embodiment thereof, when read in conjunction with the appended drawings, in which:

Fig. 3 is a fragmentary, vertical section taken along line 3—3 of Fig. 1;

Figure 2:
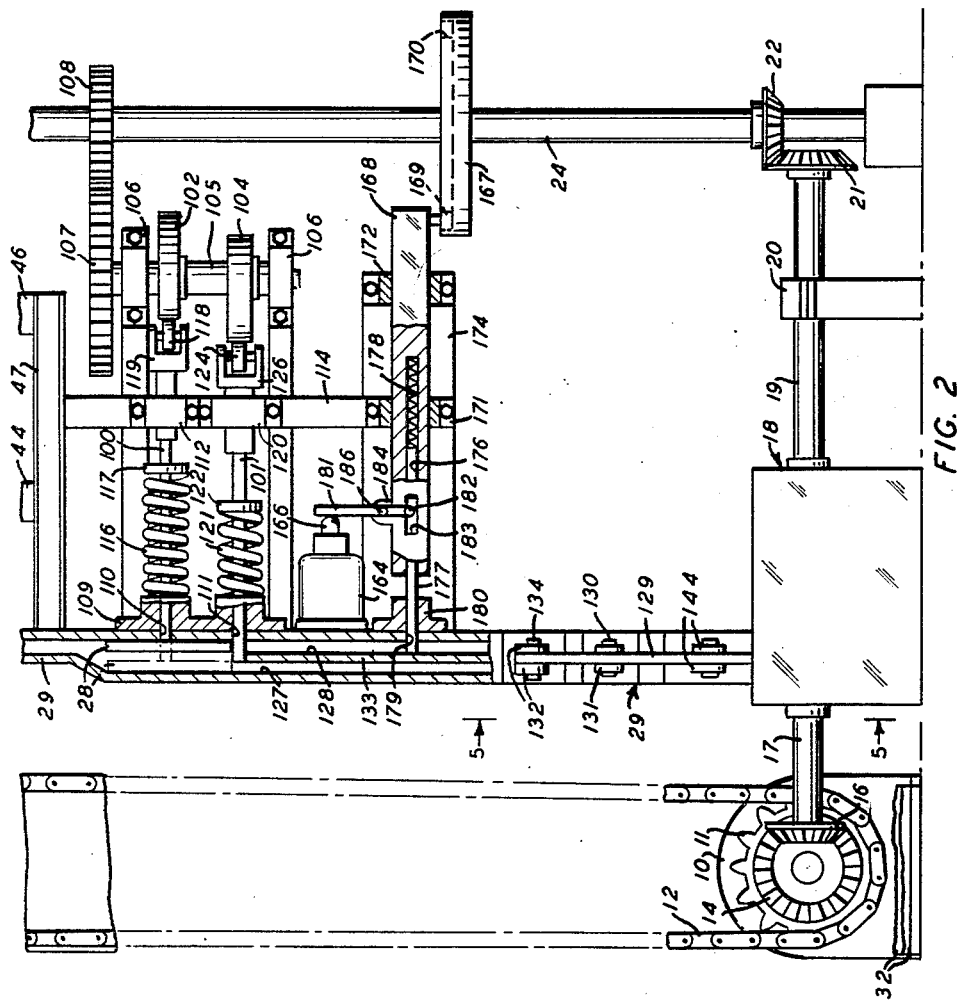
Fig. 2 is an elevation, partially in section, showing the lower portion of the apparatus.

Figs. 4a through 4d, inclusive, are views of a portion of the apparatus shown in Fig. 2 showing parts of the apparatus in the positions they occupy in various steps of the operation thereof;

Fig. 5 is a fragmentary, vertical section taken along line 5—5 of Fig. 2, and

Fig. 6 is a section taken along line 6—6 of Fig. 5.

Figure 1:
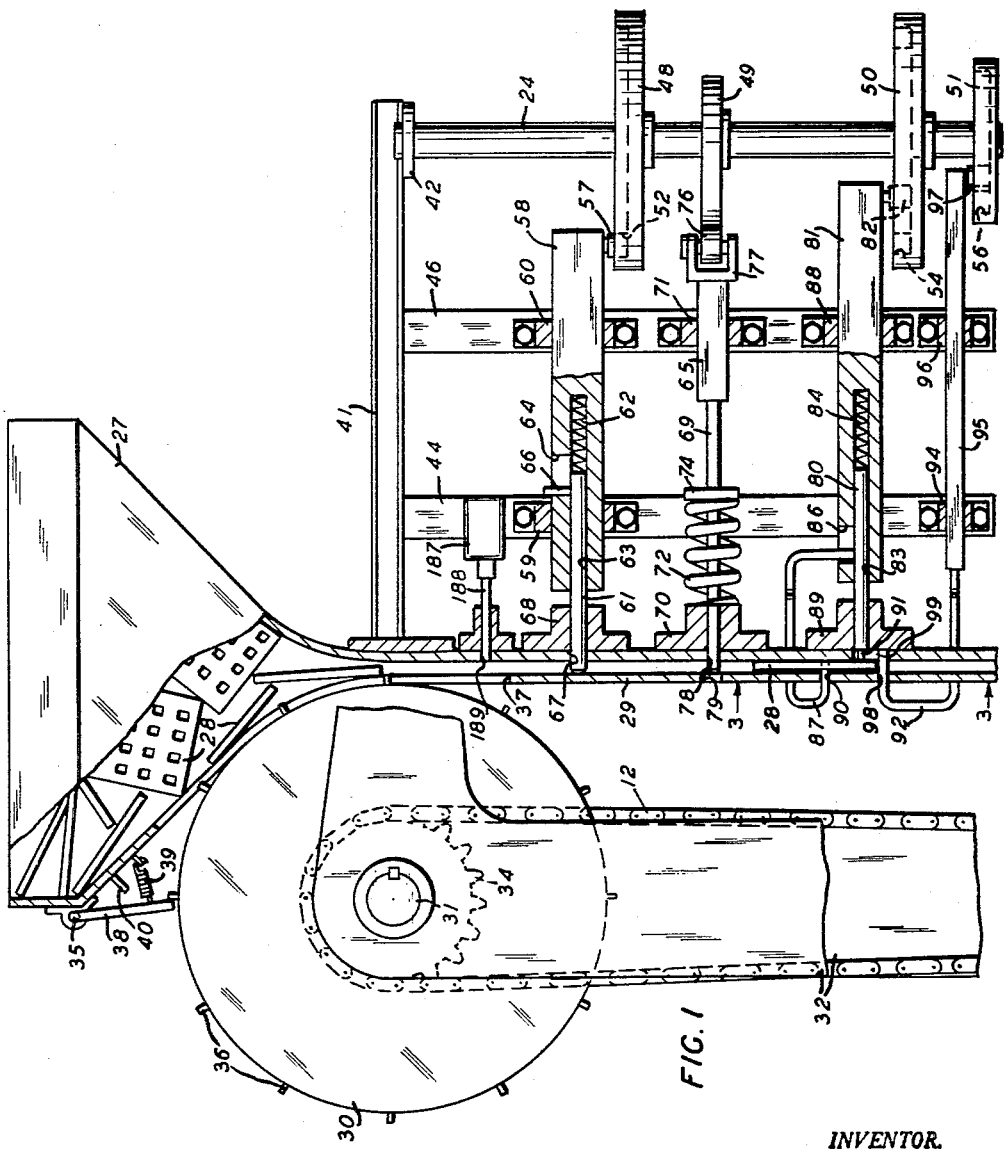
Fig. 1 is an elevation, partially in section, of the upper portion of an apparatus for magazining plate-like parts embodying certain features of the invention.

Referring now in detail to the drawings, and more particularly to Figs. 1 and 2, a motor 10 (Fig. 2) is provided to rotate a sprocket 11 and thereby to drive a chain 12 engaging the sprocket 11. The motor 10 may be of the gear head type so that the sprocket 11 and chain 12 are driven at a predetermined slow speed. Also directly connected to the output of the motor 10 is a beveled gear 14 which meshes with a second beveled gear 16. The beveled gear 16 is connected to a horizontal shaft 17, which drives a gear unit shown generally at 18. The gear unit 18 has two output shafts 19 and 26 extending therefrom (Figs. 2 and 5). The shaft 19 is supported by a suitable bearing 20 and is connected directly to a beveled gear 21 which meshes with a beveled gear 22 to drive a vertical shaft 24. The output shafts 19 and 26 are driven at a predetermined speed faster than that of the input shaft 17 due to a step-up gearing arrangement in the gear unit 18.

Into a hopper 27 (Fig. 1), a plurality of plate-like parts 28—28 are placed indiscriminately. These parts 28—28 may be made of a suitable plastic, for example, polystyrene, although it is to be understood that these parts may be made of any material for the purpose of the invention. As shown in the drawings, the parts 28—28 are plates which are rectangular in shape and having a plurality of apertures formed therein. The apertures are formed further from one of the longer sides of each part 28 than from the opposite side to leave a wider margin on that side where the apertures are further from the edge. In order that the parts 28—28 may be operated upon in an assembling machine, the parts must be fed in identical fashion thereto. For the purpose of this invention, it will be assumed that all of the parts 28—28 should leave the hopper 27 and travel in a vertical position downward with the wide margin to the right, as viewed in Figs. 3 and 5.

As the plates 28—28 leave the hopper 27, they enter a chute 29 which is wide enough to receive a single part 28. A feed wheel 30, supported on a shaft 31 which is rotatably secured to a standard 32, is rotated by the drive chain 12 through a sprocket 34. The feed wheel 30 has a plurality of pins 36—36 around the periphery thereof, which enter the interior of the hopper 27 through a slot 37 formed therein. The purpose of the wheel 30 and its associated pins 36—36 is twofold. The pins 36—36 continuously churn the parts 28—28 while permitting only a single part 28 to pass down the chute 29 at one time.

The pins 36—36 also actuate a rod 38, which is pivotally secured to the hopper 27 at 35. The rod 38 is biased toward the hopper 27 by a spring 39, and when the wheel 30 is rotated in a counterclockwise direction, as viewed in Fig. 1, the pins 36—36 strike the rod 38 and force it away from the hopper 27. The rod is forced back toward the hopper by the action of the spring 39 after a pin 36 passes thereunder and strikes a plate 40 mounted on the hopper 27 in order to vibrate the hopper and assist the feeding of the parts 28—28 from the hopper to the chute 29.

A horizontal channel 41 is secured fixedly to the chute 29 at one end and receives the shaft 24 at the other end in a suitable bearing 42. Between the chute 29 and the shaft 24, two vertical supports 44 and 46 are secured to the horizontal channel 41. The vertical supports 44 and 46 are also secured to a second horizontal channel 47 (Fig. 2) which is secured to the chute 29.

The purpose of the structure of Fig. 1 between the two horizontal channels 41 and 47 (Fig. 2) is to correctly orient the plates 28—28 as they pass down the chute 29, while the purpose of the structure of Fig. 2 between the horizontal channel 47 and the base of the machine is to feed the correctly aligned plates 28—28 to an assembly machine (not shown). The upper structure to correctly align the plates 28—28 will now be described.

*Article orienting mechanism*

A plurality of cams 48, 49, 50 and 51 are secured to and driven by the shaft 24. The cams 48, 50 and 51 are of the positive following type and provided with grooves 52, 54 and 56, respectively. The cam 49 is a plate having an eccentric contour. The groove 52 receives a roller 57 rotatably secured to a bar 58, which is slidably mounted within guides 59 and 60 secured to the supports 44 and 46, respectively. The bar 58 has a bore 63 formed therein for slidably receiving a plunger 61, which is biased to the left, as shown in Fig. 1, by a spring 62. Movement of the plunger 61 with respect to the bar 58 is limited by the length of a slot 64 formed in the bar 58 into which projects a pin 66 secured to the plunger 61.

The plunger 61 also extends into the interior of the chute 29 through a slot 67 formed therein, and is guided into the slot 67 by a guide 68. When the plunger 61 is moved to the left, as viewed in Fig. 1, as far as the cam 48 and the slot 64 permit, the left end of the plunger extends across the chute 29 to prevent the plates 28—28 from passing downward through the chute. If the plunger 61 should contact the face of one of the plates 28—28 at this time, the plate will not be damaged thereby since the plunger 61 will merely compress the spring 62 and hold the plate 28 between its left end and the interior of the chute 29.

A second plunger 69 is carried by a bar 65 and is slidably supported by a guide 70 secured to the chute 29. The bar 65 is slidably supported by a guide 71 secured to the support 46. The plunger 69 is biased to the right, as viewed in Fig. 1, by a spring 72 surrounding the plunger between the guide 70 and a collar 74 attached to the plunger. Horizontal movement is imparted to the plunger 69 by the eccentric cam 49 acting through a roller 76, rotatably mounted in a bifurcated member 77 on the end of the bar 65. The cam 49 is so constructed that when it forces the plunger 69 to the extreme left, as viewed in Fig. 1, the plunger 69 passes through slots 78 and 79 formed in the chute 29 to completely seal the chute at this point. The distance between the plungers 61 and 69 is just sufficient to receive one of the plates 28—28.

A third plunger 80 is positioned below the plunger 69 and is operated in a manner similar to that of the plunger 61. A bar 81 is actuated by a roller 82, which is guided by the groove 54 in the cam 50. There is a central bore 83 within the bar 81 in which the plunger 80 is slidably mounted. The plunger 80 is biased by a spring 84 and its movement with respect to the bar 81 is limited by the ends of a slot 86 in the bar 81 into which projects one end of a bent rod 87, attached to the plunger 80. The bar 81 is slidably supported in a guide 88, attached to the vertical support 46, and obtains further support from the sliding connection between the plunger 80 and a guide 89 attached to the chute 29.

The rod 87 is bent around the chute 29 (Figs. 1 and 3) and enters a slot 90 in a side of the chute 29 opposite to that to which the plunger 80 is adjacent. Referring to Fig. 3, the chute 29 has a somewhat semicircular bulge 93 in the area around which the rod 87 bends, and the rod 87 enters the interior of the chute 29 at a position that will permit a plate 28 to pass between the rod 87 and a side of the chute 29. At its extreme left end, as viewed in Fig. 1, the plunger 80 has a tip 91 of smaller size than the remainder of the plunger 80. The tip 91 is of just sufficient size to enter the apertures in the plates 28—28.

A fourth plunger 92 is secured to a bar 95 slidably supported in guides 94 and 96 attached to the vertical supports 44 and 46, respectively. The plunger 92 is actuated by the cam 51 through a roller 97 received in the groove 56. The plunger 92 is bent at its left end, as viewed in Fig. 1, around the chute 29 and enters the chute 29 on the same side as rod 87 through a slot 98 formed in the chute. When the cam 51 forces the plunger 92 to its extreme right position, it passes completely through the interior of the chute 29 and through a slot 99 opposite to the slot 98. Referring to Fig. 3, when the plunger 92 is in the extreme right position, as viewed in Fig. 1, it will be directly in the path of the plates 28—28. When a plate 28 rests on the plunger 92 and the wide margin of plate 28 is to the left, as is the plate 28 shown in solid lines in Fig. 3, the lower right hand aperture of the plate 28 is so positioned as to be in alignment with the tip 91.

The operation of the plate aligning feature of the invention is as follows: A large number of plates 28—28 are placed indiscriminately in the hopper 27 and, as described above, the hopper is vibrated and the plates 28—28 are agitated by the wheel 30 and pins 36—36 so that a single stream of the plates passes from the hopper into the chute 29. This stream of plates 28—28 is stopped by the plunger 69 when it is in its full leftward position due to the urging of the cam 49. When the cam 49 permits the plunger 69 to move to the right, it allows the plate 28 stopped thereby previously to pass. Simultaneously, the cam 48 moves the plunger 61 to the left to stop the stream of plates 28—28 by contacting the second plate 28 above the plunger 69. Only the plate 28 previously stopped by the plunger 69 is then permitted to fall down the chute until it contacts the plunger 92, which is, at this time, at its extreme right position due to the urging of the cam 51.

As stated above, when any of the plates 28—28 are within the chute 29 with the wide margin to the right, as viewed in Fig. 3, the plates are then in their correct position. If the wide margin of a plate 28 is on the left, as shown by the plate 28 shown in solid lines in Fig. 3, the plate is then in an incorrect position and must be turned 180° to be positioned correctly. Assuming that a plate 28 is in the incorrect position and is resting on the plunger 92, the lower right hand aperture, as viewed in Fig. 3, is in alignment with the tip 91 of the plunger 80. Therefore, as the tip 91 moves to the left, as viewed in Fig. 1, it will enter this lower right aperture and further movement of the plunger 80 to the left will move the rod 87, which is attached to the plunger 80, from within the interior of the chute 29. Meanwhile the plunger 92 is moving to the left, as viewed in Fig. 1, and its free end is being withdrawn from the interior of the chute 29. As soon as the rod 87 and the plunger 92 are so withdrawn, the incorrectly aligned plate 28 will pivot around the tip 91 from its full line position, shown in Fig. 3, to its phantom-line position around the semicircular bulge 93 of the chute 29. It will be noticed that the radius of the semicircular bulge 93 is slightly greater than the distance between the center of the tip 91 and the diagonally opposite corner of the plate 28 so that the plate has room to turn through substantially 180°. As soon as the tip 91 is withdrawn from the aperture in the plate 28, the plate will continue down the chute correctly oriented, that is, with the wide margin thereof to the right, as viewed in Fig. 3.

If the above-mentioned plate 28 had been in its correct position as it came to rest on the plunger 92, then when the plunger 80 moved to the left, the tip 91 would have contacted the margin on the plate 28. In such case, the plunger 80 would compress the spring 84 and the plate 28 would be held between the tip 91 and the wall of the chute 29. Therefore, the plate 28 would not pivot when the rod 87 and the plunger 92 were withdrawn from the interior of the chute 29.

The plunger 92 must be withdrawn a sufficient length of time to permit the tip 91 to move to the right and release the plate 28. Since the rod 87 is connected directly to the plunger 80 having the tip 91 on the free end thereof, the rod 87 will also move to the right as the tip withdraws and re-enter the interior of the chute 29. The rod 87 serves as a guide so that the plate 28 slides between it and the side of the chute 29 in its correctly oriented position without turning. After the plate 28 has passed thereby, the plunger 92 will re-enter the interior of the chute 29 and be prepared to receive the next plate 28.

It may be desired to feed the correctly aligned plates 28—28 to more than one assembling apparatus that assemble the plates into terminal strips. Another feature of the invention is to provide a mechanism for feeding an equal number of plates 28—28 to two such assembling machines, and this mechanism will now be described.

*Article feeding mechanism*

Referring to Fig. 2, a pair of plungers 100 and 101 are provided, which are actuated by cams 102 and 104, respectively, rotatably mounted on a shaft 105 supported by bearings 106—106. The shaft 105 is rotated at one-half the speed of the shaft 24 by gears 107 and 108.

The plungers 100 and 101 are slidably mounted in and partially supported by a guide 109, which directs the plunger 100 through an aperture 110 in the chute 29 and the plunger 101 through an aperture 111 in the chute. The plunger 100 is further slidably supported by a guide 112 on a vertical support 114, which is attached to the horizontal channel 47. The plunger 100 is urged to the right, as viewed in Fig. 2, by an encircling spring 116, which is compressed between the guide 109 and a collar 117. A roller 118 is carried by a bifurcated member 119 at the right end of the plunger 100.

The plunger 101 is supported by a guide 120 attached to the support 114 and is urged to the right by an encircling spring 121 mounted between the guide 109 and a collar 122 attached to the plunger 101. The plunger 101 is operated by the cam 104 through a roller 124 mounted in a bifurcated member 126 at the right end thereof.

To feed an equal number of plates 28—28 to two assembling machines, the chute 29 is widened at a point below the horizontal channel 47 and is divided into two chambers 127 and 128 by a plate 133. Each of the chambers 127 and 128 is wide enough to receive the plates 28—28. The only difference between the structures associated with the plungers 100 and 101 is the setting of the cams 102 and 104. This difference in setting is necessary in order to direct alternating plates 28—28 first into the chamber 127 in the chute 29 and next into the second chamber 128 in order that equal numbers of plates 28—28 are delivered to these chambers and thence to the assembling machines.

In the present embodiment of the invention, the cams 102 and 104 may be similar in shape and the cam 104 is revolved 90° with respect to the cam 102 on the shaft 105. The cams must be so shaped that they hold the plungers 100 and 101 in a "retracted" position, i.e., in the position of the plunger 100 of Fig. 2 where the plunger is withdrawn from the chute 29, for ¾ of their revolutions, and hold the plungers 100 and 101 in an "extended" position, i.e., in the position of the plunger 101 of Fig. 2 where the plunger is within the chute 29, for ¼ of their revolutions. The retracted position of the plungers 100 and 101 is obtained by making the cams 102 and 104 in the form of a circle for ¾ of a revolution thereof, so that the rollers 118 and 124 are equidistant from the axis of the shaft 105 for that period. The extended position of the plungers is obtained by providing lobes on the cams 102 and 104, so that the cam followers are forced to the left, as viewed in Fig. 2, for ¼ revolution of the shaft 105. This will move the plungers 100 and 101 into the chute 29 for the required ¼ revolution of each cam.

As indicated above, the shaft 24 makes two revolutions for each revolution of the shaft 105 due to the 2-to-1 step down arrangement of the gears 107 and 108. As a result, two plates 28—28 are released by the tip 91 and fall down the chute 29 in correctly aligned positions to the level of the plungers 100 and 101 each time the shaft 105 makes one revolution. Referring now to Fig. 4a, it will be assumed that at a given time, the plunger 101 is extended across the chamber 128 and that the plunger 100 is in its retracted position. This representation in Fig. 4a is the same as shown in Fig. 2, and the operation of the plungers 100 and 101 and their actuating structure will be explained using these positions as starting points.

Assuming that a first correctly aligned plate has fallen to the position shown in Fig. 4a after having been released by the tip 91, this plate is held in this position by the plunger 101. After ¼ revolution of the shaft 105, the plunger 100 will be extended to push the plate 28 to the left, as viewed in Fig. 4a, until it falls into the chamber 127 (Fig. 4b). Another ¼ revolution of the shaft 105 causes the cams 102 and 104 to retract both plungers 100 and 101, respectively, from the chute 29, as shown in Fig. 4c. This completes ½ revolution of the shaft 105 and also a full revolution of the shaft 24. Consequently, a second plate 28 is released by the tip 91, and since both plungers 100 and 101 are in their retracted positions, as shown in Fig. 4c, this second plate 28 will fall directly down the chamber 128 because there is no restriction in its path.

In the next ¼ revolution of the shaft 105, the plungers will be retained in their retracted position, as shown in Fig. 4d. During the time consumed for this ¼ revolution, no plate 28 is released by the tip 91 and the position of the plungers 100 and 101 is immaterial. However, with the cams 102 and 104 shaped as discussed hereinbefore, the plungers 100 and 101 will be retracted at this time. The reason for so doing is to keep the shape of the cams 102 and 104 as simple as possible.

During the next ¼ revolution of the shaft 105, the plunger 100 is retained in its retracted position and the plunger 101 is extended. The shaft 105 has, at the end of this ¼ revolution, made a complete revolution with respect to the assumed starting point, and consequently, the plungers 100 and 101 have returned to the positions shown in Fig. 4a. The shaft 24 has completed its second revolution and a third correctly aligned plate 28 is released by the tip 91. With the plungers 100 and 101 in the positions shown, the third plate 28 will fall to the position shown in Fig. 4a and another cycle of operation ensues.

In order to feed the plates 28—28 from the chambers 127 and 128, a common feeding device (Figs. 2 and 5) is provided for the chambers. The feeding devices comprise a lever 129 pivotally secured by a pin 130 to a post 131 attached to the chute 29. Two bars 132—132 are loosely mounted to the upper end of the lever 129 by a pin 134. This loose connection is necessary in order that the lever 129 impart horizontal movement to the bars 132—132. A central aperture 136 is formed longitudinally of each bar 132, and a plunger 137 extends into each aperture 136. Each plunger 137 is biased to the left, as viewed in Fig. 5, with respect to the bar 132 by a spring 138 and to the right by an encircling spring 139, which is compressed between a guide 140 and a collar 141 attached to each plunger 137. Each plunger 137 enters a slot 142 in the chute 29 and, when it is in its extreme left position, the plunger 137 contacts any plate 28 which may be in the chute 29. Two other plungers 144—144 are loosely secured to the lever 129 by a pin 146. This loose fit is again necessary to obtain horizontal movement of the plungers 144—144. Each plunger 144 is supported by a sleeve 147 and guided thereby into a slot 148 in the chute 29.

Pivotally mounted by a pin 149 to the lower end of the lever 129 is a block 150. The block 150 has secured thereto two push rods 151 and 152 (Fig. 6) which enter the chambers 127 and 128, respectively. The rods 151 and 152 are supported by a guide 153 which directs the rods into slots 154—154 in a curved portion of the chute 29. Also secured to the block 150 is a cam follower 156, which follows a groove 157 in a helical cam 158. The cam 158 is supported by a pair of bearings 159 and 160, and is driven by the shaft 26 which has a driven connection within the gear unit 18 with the shaft 17 (Figs. 2 and 5). Mounted between the bearings 159 and 160 is a guide plate 161, which has a slot 162 therein to guide the cam follower 156 in a reciprocating path determined by the helical groove 157.

The operation of the feed mechanism for the chamber 127 will now be described. It will be understood that the same operation takes place for the chamber 128. When the cam follower 156 is driven in the groove 157 to the left side of the cam 158, as viewed in Fig. 5, the lever 129 pivots about the pin 130 and forces the plunger 144 to the left into the interior of the chamber 127. The bar 132 meanwhile is moved to the right, which movement withdraws the plunger 137 from within the chamber 127 and permits the correctly aligned plates 28—28 to fall until the lowermost plate 28 is stopped by the plunger 144. The push rod 151 is at this time at its extreme left position within the chute 29.

As the cam follower 156 moves to the right of the helical cam 158 in the groove 157, the plunger 144 and the rod 151 move to the right and are withdrawn from the chamber 127. Simultaneously, the plunger 137 is moved to the left and contacts the plate 28 immediately opposite thereto to stop the stream of plates in the chamber 127. Since the plunger 144 and the rod 151 are then withdrawn, only the first plate 28 falls down the chamber 127 and enters the horizontal portion thereof shown in the lower portion of Fig. 5. When the cam follower 156 next moves to the left, the rod 151 is moved to the left to push the plate 28 and any preceeding it toward the assembling machine (not shown). When this occurs, the plate next above the first plate is released by the plunger 137 and falls down the chamber 127 until it contacts the plunger 144 which is also to the left within the chute 29.

Safety device

A safety feature is provided in the present embodiment of the invention to prevent too many plates 28—28 from stacking up within the chambers 127 and 128. A stream of plates 28—28 up to a point immediately below the plungers 100 and 101 is permissible, but if these plates are allowed to stack any further up the chambers 127 and 128, the operation of the plungers 100 and 101 will be impaired. Therefore, a microswitch 164 (Fig. 2) is provided and may be secured to the chute 29. The switch 164 may be actuated by a button 166 attached thereto. The button 166 may be actuated if the chamber 128 is filled with plates 28—28 up to the general area of the microswitch 164. A cam 167 controls the position of a bar 168 by means of a cam follower 169. The cam follower 169 is guided by a groove 170 in the cam 167, which is driven by the shaft 24.

The bar 168 is slidably supported in a pair of guides 171 and 172 supported by a plate 174 attached to the chute 29 and the vertical support 114. The bar 168 has a central aperture 176 in which a plunger 177 is received. The plunger 177 is biased to the left, as viewed in Fig. 2, by a spring 178 and is guided into a slot 179 in the chute 29 by a guide 180. An arm 181 is pivotally secured to the plunger 177 by a pin 182 which extends through a slot 183, the ends of which determine the limits of the relative movement between the plunger 177 and the bar 168. The arm 181 is alos pivotally secured to a lug 184 on the bar 168 by a pin 186.

If no plates 28—28 are in the chamber 128 at the level of the plunger 177, the plunger is permitted to move to its extreme leftward position, as shown in Fig. 2, when the cam 167 places the bar 168 in its extreme leftward position. In that case, the plunger 177 will not slide in the central aperture 176 in the bar 168 against the spring 178 to cause the arm 181 to pivot about the point 186 since the pin 182 and the lug 184 will not move with respect to each other and this extreme leftward position of the plunger 177 places the upper end of the arm 181 in a position as shown in Fig. 2 so that the button 166 is not depressed sufficiently to actuate the microswitch 164. If, however, a plate 28 is in the chamber 128 at the level of the plunger 177, the plunger is not permitted to attain its extreme leftward position because it is blocked by the plate 28 and the end thereof reaches a position adjacent to the inner edge of the slot 179 in the chute 29. Under this condition, the plunger 177 will slide in the central aperture 176 in the bar 168 against the spring 178 to cause the upper portion of the arm 181 to be pivoted to its extreme lefthand position when the bar 168 is placed in its extreme leftward position by the cam 167. The arm 181, therefore, depresses the button 166 sufficiently to actuate the switch 164. The switch 164 may close a circuit to energize, for example, a solenoid 187 (Fig. 1) which moves an armature 188 in the form of a plunger into a slot 189 in the chute 29 at a point above the plunger 61 to stop the flow of plates 28—28 from the hopper 27. The solenoid 187 that energizes the plunger 188 must be of a type wherein its armature (plunger 188) is not immediately retracted from the chute 29 when the coil is electrically de-energized, since the arm 181 only actuates the switch 164 momentarily and then the cam 167 causes the arm 181 to move to the right, as viewed in Fig. 2, to again open the switch 164. Many other arrangements could be used to stop the flow of plates 28—28 and the use of a solenoid 187 and a plunger 188 is merely illustrative. The important feature necessary is that the flow of plates 28—28 from the hopper 27 through the chamber 29 be stopped until the chamber 128 is again clear, at which time the arm 181 will not actuate the microswitch 164 and, at a predetermined time, the solenoid 187 controlled thereby will de-energize and withdraw the plunger 188. The plates 28—28 may then pass from the hopper 27 through the chamber 29 in their usual manner. Obviously, since the plates 28—28 are fed alternately to the chambers 127 and 128, the safety device described above is necessary in only one chamber, and when the feeding of the plates 28—28 to one chamber is stopped, it is stopped to the other.

While the above-described apparatus is particularly adapted for orienting parts that have a plurality of apertures therethrough, it may be readily adapted to orient and feed parts that have merely recesses or indentations therein without departing from the spirit and scope of the invention.

What is claimed is:

1. Apparatus for orienting plate-like articles having a plurality of recesses at predetermined points therein, which comprises a guideway through which such articles may be passed, means for supporting one side of one of said articles, means for supporting the lower extremity of said one of the articles in cooperation with the last-mentioned means to support said article in a predetermined position and in random orientation, and means displaced horizontally from a vertical line containing the center of gravity of a supported article for entering the guideway and a recess in one of the articles which is misoriented while said article is being held in a predetermined position and in random orientation by the first two mentioned means, both of said first two mentioned means being reciprocably mounted in said guideway for removal from the side and lower extremity of said article for permitting the upper extremity thereof to drop by forces resulting solely from the force of gravity and pivot the article about said last-mentioned means to reorient the article.

2. Apparatus for orienting plate-like parts having a plurality of apertures therein, which comprises a hopper into which said parts may be placed, a chute connected to the outlet end of said hopper through which said parts may pass one by one in random orientation, a slot in said chute, means for supporting each of said parts successively in a predetermined location in said chute, and a member for passing through said slot into the interior of said chute and through an aperture in a side of a misoriented one of said parts in the predetermined location with respect to said slot in said chute for forming a stationary pivot displaced laterally of the center of gravity of the part which pivot remains stationary during the entire orienting operation, whereby when the support of the means for supporting said parts is removed from said part, said part pivots about said member as a result of the force of gravity on said part to correctly orient the same.

3. Apparatus for orienting plate-like parts having a plurality of apertures therein, which comprises a chute, means for supplying a series of said parts to said chute, some of said parts in the series being correctly oriented and some incorrectly oriented, means movable into said chute for supporting each part successively in a predetermined position and in random orientation, and part-engaging means displaced horizontally from a vertical line containing the center of gravity of each of the supported parts movable into said chute and into one of a plurality of predetermined apertures in said part which is incorrectly oriented within said chute, said part-engaging means entering into an aperture in said part while said part is being held in the predetermined position and in misorientation with respect to said chute to form a stationary pivot about which said part pivots upon retraction of said supporting means as a result of the force of gravity on said part to correctly orient said part within said chute.

4. Apparatus for magazining plate-like parts having a plurality of apertures therein, which comprises a hopper into which a plurality of said parts are placed indiscriminately, a chute connected to the output end of said hopper for receiving a single stream of said parts in random orientation and having a plurality of slots therein, a first cam-operated means for entering a first of said slots for stopping one of said parts in a predetermined position and in random orientation, a second cam-operated means displaced horizontally from a vertical line containing the center of gravity of each of the supported parts for entering a second of said slots and an aperture in a misoriented part while said part is being held in the predetermined position by said first cam-operated means, whereby when said first cam-operated means has been removed from said part said part pivots about said second cam-operated means as a result of the force of gravity on said part for correctly orienting said part in said chute, and means for actuating both of said cam-operated means for alternately placing them within and without said chute.

5. Apparatus for orienting plate-like parts having a plurality of apertures in the faces thereof, which comprises a hopper into which a plurality of said parts are placed, a chute at the output end of said hopper for receiving a single stream of said parts in random orientation, said chute having a plurality of slots therein, a first plunger for reciprocation through one of said slots between positions within and without said chute, a second plunger for reciprocation between positions within and without said chute through a second of said slots, said first plunger being for retaining the whole stream of plates except a single plate, said second plunger being for releasing said single plate in time sequence down the chute, a third plunger for reciprocation between positions within and without said chute through a third of said slots, a fourth plunger for reciprocation between positions within and without said chute through a fourth slot in said chute for stopping and supporting said single plate in a predetermined position and in a random orientation in said chute, said third plunger being displaced horizontally from a vertical line containing the center of gravity of said supported plate for entering an aperture in a single incorrectly oriented plate so that when said fourth supporting plunger withdraws from said chute said single plate is pivoted about said third plunger as a result of the force of gravity on said plate and released thereby when said third plunger is withdrawn from said chute, means for guiding the correctly oriented plates down said chute, and cam means for reciprocating said plungers.

6. Apparatus for orienting and feeding plate-like parts having a plurality of apertures in the faces thereof, which comprises a chute into which a plurality of said parts are fed, means for entering the chute for permitting a single part to pass therethrough in a random orientation while stopping the remaining parts within said chute, reciprocating means for holding a single part in a predetermined position in said chute and in a random orientation and for releasing the single part in a predetermined sequence, means displaced horizontally from a vertical line containing the center of gravity of the held part for entering said chute and one of a predetermined plurality of apertures in an incorrectly oriented part for causing said incorrectly oriented part to pivot thereabout in said chute as a result of the force of gravity on said part when the part is released by the reciprocating means while allowing the correctly oriented parts to remain in the same desired orientation, and means for entering said chute and feeding the parts down said chute.

7. Apparatus for orienting and feeding plate-like parts having a plurality of apertures in the faces thereof, which comprises a hopper into which a plurality of said parts are placed indiscriminately, a chute at the output end of said hopper for receiving a stream of said parts from said hopper with some of said parts correctly oriented and some incorrectly oriented, a plurality of slots in said chute, a plurality of plungers for alternately entering and withdrawing from said slots, cam means for actuating said plungers, a pair of said plungers for entering said chute and for intermittently stopping said stream of parts from said hopper while intermittently permitting single parts to pass down said chute in random orientation, a third of said plungers for entering within said chute and within an aperture in an incorrectly oriented part which is displaced horizontally from a vertical line containing the center of gravity of the part for permitting pivoting of the part about said third plunger as a result of the force of gravity on said part, a fourth of said plungers for entering said chute and stopping said single part in a predetermined position and randomly oriented within said chute to permit said third plunger to enter an aperture in an incorrectly oriented part and to allow said single part to pass in the correctly oriented position down said chute when said third plunger withdraws therefrom, and means for feeding the correctly oriented parts and reoriented parts from said chute.

References Cited in the file of this patent

UNITED STATES PATENTS

| | | |
|---|---|---|
| 559,534 | Lohsand | May 5, 1896 |
| 639,431 | Pondorf | Dec. 19, 1899 |
| 2,137,173 | Malloy | Nov. 15, 1938 |
| 2,661,709 | Troll | Dec. 8, 1953 |
| 2,662,626 | Graham et al. | Dec. 15, 1953 |
| 2,791,314 | Meier | May 7, 1957 |